United States Patent
Siddiqui et al.

(10) Patent No.: US 9,532,578 B2
(45) Date of Patent: Jan. 3, 2017

(54) SMOKABLE THERMOPLASTIC CASING

(71) Applicant: Viskase Companies, Inc., Lombard, IL (US)

(72) Inventors: Aamir W. Siddiqui, Naperville, IL (US); Nancy Tamez de Caballero, Houston, TX (US)

(73) Assignee: Viskase Companies, Inc., Lombard, IL (US)

(*) Notice: Subject to any disclaimer, the term of this patent is extended or adjusted under 35 U.S.C. 154(b) by 362 days.

(21) Appl. No.: 14/364,295

(22) PCT Filed: Dec. 12, 2012

(86) PCT No.: PCT/US2012/069271
§ 371 (c)(1),
(2) Date: Jun. 10, 2014

(87) PCT Pub. No.: WO2013/090442
PCT Pub. Date: Jun. 20, 2013

(65) Prior Publication Data
US 2014/0322394 A1 Oct. 30, 2014

Related U.S. Application Data (60) Provisional application No. 61/569,771, filed on Dec. 12, 2011.

(51) Int. Cl.
*A22C 13/00* (2006.01)
*C08J 5/18* (2006.01)
(Continued)

(52) U.S. Cl.
CPC .......... *A22C 13/0013* (2013.01); *A22C 11/00* (2013.01); *A23L 13/65* (2016.08); *C08J 5/18* (2013.01);
(Continued)

(58) Field of Classification Search
CPC ................ A22C 13/0013; A22C 2013/0089; A22C 2013/0086; A22C 2013/0073; A22C 2013/0063; A22C 2013/0083; A22C 22/00; A22C 2013/005; A22C 2013/0059; Y10T 428/1324; C08J 5/18; C08J 2377/00; C08J 2377/02; C08J 2429/04; C08L 77/00; C08L 77/02; C08L 77/06; A23V 2002/00; A23L 13/65
See application file for complete search history.

(56) References Cited

U.S. PATENT DOCUMENTS 3,456,044 A   7/1969   Pahlke
4,303,711 A   12/1981  Erk et al.
(Continued)

FOREIGN PATENT DOCUMENTS

WO    02078455 A1    10/2002
WO    2004065466 A1   8/2004
(Continued)

OTHER PUBLICATIONS

PCT International Preliminary Report on Patentability and Written Opinion, PCT/US2012/069271 dated Jun. 17, 2014.
(Continued)

*Primary Examiner* — Michael C Miggins
(74) *Attorney, Agent, or Firm* — Donna Bobrowicz; Allen C. Turner (57) ABSTRACT

A novel smokable thermoplastic film, smokable by both liquid smoke and gaseous smoke, that may be produced as a film or a tube, as in a food casing. This newly disclosed film is a blend of a polyamide base, an amorphous polyvinyl alcohol and, optionally, an antiblocking agent.

17 Claims, 2 Drawing Sheets

(51) Int. Cl.
*C08L 77/00* (2006.01)
*C08L 77/02* (2006.01)
*C08L 77/06* (2006.01)
*A22C 11/00* (2006.01)

(52) U.S. Cl.
CPC .............. *C08L 77/00* (2013.01); *C08L 77/02* (2013.01); *C08L 77/06* (2013.01); *A22C 2013/005* (2013.01); *A22C 2013/0059* (2013.01); *A22C 2013/0063* (2013.01); *A22C 2013/0073* (2013.01); *A22C 2013/0083* (2013.01); *A22C 2013/0086* (2013.01); *A22C 2013/0089* (2013.01); *A23V 2002/00* (2013.01); *C08J 2377/00* (2013.01); *C08J 2377/02* (2013.01); *C08J 2429/04* (2013.01); *Y10T 428/1324* (2015.01)

(56) References Cited

U.S. PATENT DOCUMENTS

| | | |
|---|---|---|
| 4,560,520 A | 12/1985 | Erk et al. |
| 4,851,245 A | 7/1989 | Hisazumi et al. |
| 4,886,634 A | 12/1989 | Strutzel et al. |
| 4,892,765 A | 1/1990 | Hisazumi et al. |
| 5,084,310 A | 1/1992 | Hisazumi et al. |
| 7,361,392 B2 | 4/2008 | Borodaev et al. |
| 7,727,604 B2 | 6/2010 | Schiffmann |
| 7,838,094 B2 | 11/2010 | Delius et al. |
| 7,976,942 B2 | 7/2011 | Stalberg et al. |
| 8,026,302 B2 | 9/2011 | Shibutani et al. |
| 2004/0062889 A1 | 4/2004 | Borodaev et al. |
| 2005/0163948 A1 | 7/2005 | McGarel |
| 2006/0202397 A1 | 9/2006 | Stalberg et al. |
| 2007/0054013 A1 | 3/2007 | Schiffmann |
| 2010/0159092 A1 | 6/2010 | Schiffmann |
| 2011/0076511 A1 | 3/2011 | Paolilli et al. |
| 2011/0171489 A1 | 7/2011 | Shichen et al. |
| 2011/0268938 A1 | 11/2011 | Schuhmann |

FOREIGN PATENT DOCUMENTS

| | | |
|---|---|---|
| WO | 2004098298 A2 | 11/2004 |
| WO | 2004103079 A1 | 12/2004 |
| WO | 2004098298 A3 | 6/2005 |
| WO | 2011038248 A1 | 3/2011 |
| WO | 2011103452 A1 | 8/2011 |
| WO | 2012134347 A2 | 10/2012 |
| WO | 2013090442 A1 | 6/2013 |

OTHER PUBLICATIONS

PCT International Search Report, PCT/US2012/069271, dated Apr. 23, 2013.
Third-party observation submitted Dec. 26, 2013.
Third-party observation submitted Mar. 28, 2014.
PCT International Written Opinion, PCT/US2012/069271, dated Apr. 23, 2013.
European Search Report for EP 12 856 788.0 dated Sep. 13, 2016.

FIG. 1

NICHIGO G-POLYMER OKS-8089P

Apparent Melt viscosity

FIG. 2

SMOKABLE THERMOPLASTIC CASING

CROSS-REFERENCE TO RELATED APPLICATION(S)

This application is a national phase entry under 35 U.S.C. §371 of International Patent Application PCT/US2012/069271, filed Dec. 12, 2012, designating the United States of America and published in English as International Patent Publication WO 2013/090442 A1 on Jun. 20, 2013, which claims the benefit under Article 8 of the Patent Cooperation Treaty and under 35 U.S.C. §119(e) to U.S. Provisional Patent Application Ser. No. 61/569,771, filed Dec. 12, 2011, the disclosure of each of which is hereby incorporated herein in its entirety by this reference.

TECHNICAL FIELD

The disclosure relates to thermoplastic films and particularly tubular food casings suitable for the processing and production of smoked sausages or other foodstuffs. These films have a porosity that allows both gaseous and liquid smoke to migrate through them, to flavor and/or color the encased foodstuff, while surprisingly, providing a high degree of oxygen barrier properties.

BACKGROUND

Historically, various foodstuffs such as sausages and cheeses have been produced in casings that were either natural, for example, as derived from animal intestines, or synthetic, such as those made from collagen or cellulose. The foodstuff is introduced into the casing and because of the permeability of these types of casing, the foodstuff, such as sausage meat, can be exposed to wood smoke, available in both gaseous and liquid forms, which imparts a flavor and/or color component to the sausage.

Currently, sausage manufacturers are interested in having another type of synthetic casing based on polymers and, in particular, thermoplastics available. These thermoplastic casings need to be porous enough to be smokable by liquid and/or gaseous smoke. Although plastic casings are well-known in sausage manufacturing, smokable plastics pose unique problems because of their impermeability to air and liquids.

Currently, thermoplastic casings are primarily larger sized casings, and because of their oxygen barrier properties, may remain on the meat product after processing. However, there is a demand for smaller diameter casings to produce hot dog-type sausages, and generally these types of casings must be removed from the processed sausage, although some manufacturers may prefer to leave the casing on as an oxygen barrier when sold to the consumer, who will remove it prior to heating and eating.

Some thermoplastic casings are made from polyamides, either monolayer or multilayer films having at least one polyamide (nylon) layer. Casings comprising a blend of nylon with polyester are also known, as are multilayer casings of nylon with ethylene polymers or copolymers. These types of casings also may have a moisture content ranging from about 1-3 weight % (wt. %). Multilayer casings, such as those having an outer layer of nylon and an inner or food contact layer of an absorbent material such as a cellulosic film or a polymer with an open cell structure, are also known. There are thermoplastic casings that are smokable with gaseous smoke and that produce a range of colors and flavors, from slightly reddish to that approximating the color seen when cellulosic casing is used and smoked.

Smoke is available in both liquid and gaseous forms. Both are well-known to those in the sausage and food processing industry. The liquid version is often used in processing operations where linked sausages are sprayed or pulled through baths of the liquid smoke, generally at room temperatures. The moisture barrier properties of thermoplastic casings generally impede the transfer of liquid smoke through the casing to the enclosed meat. Cellulosic casings are preferred for color and taste transfer using liquid smoke, as well as with gaseous smoke.

What is still needed are plastic casings that may be produced at high speeds, that will be stiff enough to maintain their shape once stuffed with the foodstuff, that do not wrinkle during sausage production, and that are porous enough to allow smoke components present in both liquid smoke and gaseous smoke to pass through to the encased food.

As discussed in U.S. Pat. No. 4,303,711, "Tubular film for packing and casing paste-type foodstuffs especially sausage and cheese," Erk et al., issued Dec. 1, 1981, "single-layer, unstretched plastic casings consisting of higher homo-polyamides (polyamide 11 and polyamide 12)" are known, as well as plastic casings consisting of such polyamides coextruded in two layers with polyamide 6 as the outer layer. These polyamide casings may be easily made by the blown film technique, but typically suffer from a lack of dimensional stability and uniformity, being deformed upon stuffing so that production of stuffed sausages to a uniform diameter is difficult. The '711 patent further indicates that these unstretched films suffer from an undesirably wrinkled appearance after cooking and chilling. These casings are meant to be left on the finished sausage and, therefore, a wrinkled appearance is a negative trait. Additionally, this casing is not meant to be porous, but rather to be impermeable to moisture and oxygen.

The contents of each patent and publication identified herein are incorporated herein to this application in their entirety by this reference.

To overcome the defects or inadequate performance of seamless thermoplastic casings produced by blown film technology, plastic casings have been produced using stretch orientation.

Also, various attempts have been made at making stretch oriented polyamide casings. Uniaxially stretched casings, which are only stretched in the longitudinal ("machine") direction ("MD"), reportedly have the same disadvantages as unstretched casings regarding insufficient dimensional stability, nonuniformity of diameter, and excessive wrinkling.

U.S. Pat. No. 4,560,520, "Single-layer elastic tubular film of polyamide used for packaging paste substances and a process for the production of such film," Erk et al., issued Dec. 24, 1985, discloses forming multiaxially stretched, monolayer, polyamide, tubular films, e.g., of nylon 6 or nylon 66, which have elastic properties and which are to be used for packaging table sausages and boiled sausages. The disclosed films are "fixed thermally" and shrunk after stretching, e.g., by subjecting the tube to controlled shrinkage of at least 15% and at most 40% at temperatures above 90° C. and also subjecting the film to infrared irradiation. This is to produce a nylon casing that does not have shrinkage at temperatures under 90° C. This pre-shrunk casing is used for stuffing with meat emulsion and relies upon its elastic properties to provide wrinkle resistance.

Again, this casing is meant to be left on the finished sausage, and to protect it from air and water while so encased. It is not permeable to any coloring or flavoring agents used on the outside of the encased sausage.

Additionally, orientation of seamless tubes of nylon by biaxial stretching is difficult. Extrusion and orientation of multilayer tubes, especially coextruded tubes, containing mixed layers of polyamides and other materials having different melting points, melt viscosities, and a different affinity for water can be very difficult. For example, U.S. Pat. No. 4,892,765, "Heat-shrinkable laminate film and process to produce the same," Hisazumi et al., issued Jan. 9, 1990, notes that although it is desirable to extrude films for packaging hams and sausages in tubular form, it is difficult to make a stretched tubular polyamide film of uniform thickness. Hisazumi et al. disclose production of a heat-shrinkable multilayer film having a core layer of a polyvinylidene chloride copolymer attached to opposing polyamide layers (e.g., of nylon 6/66 copolymer) by opposing adhesive layers. This film is made using an orientation process that utilizes water to soften and plasticize the nylon to a degree sufficient to allow or facilitate orientation.

Generally, attempts at biaxially stretching nylon multilayer casings have used polyamide as the outer layer of the tube. The orientation processes employed for nylon multilayer casings have tended to involve complicated apparatus and processing such as that found in U.S. Pat. No. 4,886,634, "Process and apparatus for the production of an extruded, stretched, seamless tube," Strutzel et al., issued Dec. 12, 1989.

This type of casing or film is not meant to be permeable to air or water and, therefore, is of no use when producing sausages or food products treated with coloring or flavoring agents during the processing cycle.

A number of other thermoplastic casings that have a degree of permeability have been described in the literature.

In EP 0139888, "Process for smoking in thermoplastic casings foodstuffs that are either heated after packing or packed in a hot fluid state," Erk et al., published May 8, 1985, linear aliphatic polyamides combined with other polymers such as an ionomer resin, modified ethylene vinyl acetate copolymers and/or modified polyolefins are taught for making smokable casings. Although under wet smoking conditions taste and fragrance is transferred, these casings have low gas permeability and it is believed that they result in products that are more moist than generally acceptable, and cannot replace cellulose or other natural casings.

Other high barrier casings in respect to oxygen and vapor have been described. For example, coextrusion of polyvinylidene chloride copolymers ("PVDC") with polyamides or polyolefins have proven difficult because PVDC is very temperature and shear sensitive during extrusion. These copolymers are extrudable only over a narrow temperature range without causing degradation of the polymer in the extruder or die, which causes imperfections in the film. Polyamides require much higher temperatures for extrusion—generally about 200° C. or higher. At these higher extruder and die temperatures, coextrusion of polyamide with PVDC is difficult and degradation of the PVDC may be expected, even if the PVDC layer is insulated from polyamide layers by intermediate layers. Resulting imperfections in the film may detrimentally affect the appearance, strength, and barrier properties of the film and/or ease of orientation or biaxial stretching. In U.S. Pat. No. 5,084,310, "Smoked food-package and smoking process," Hisazumi et al., issued Jan. 25, 1992, a mixture of PVDC and a low melting point polyamide is taught, producing a smokable polyamide. The resultant product allows the passage of a small amount of water vapor, but the smoked taste of the final product is much less than that of sausages made with conventional smoked cellulose casings.

U.S. Pat. No. 7,361,392, to Borodaev et al., titled "Packaging from a polymer film for food products," issued Apr. 22, 2008, teaches a polymer film that is primarily polyamide with a hydrophilic compound, that forms a highly dispersed phase and is capable of mixing with at least 10 wt. % of water. Among the examples, two films are produced using two different polyvinyl alcohols as the hydrophilic component. One polyvinyl alcohol produced an acceptable film (i.e., smokable, good mechanical properties) while the other did not.

U.S. Pat. No. 4,851,245, "Smokable synthetic food-packaging film," Hisazumi et al., issued Jul. 25, 1989, teaches a smokable food-packaging film comprising at least one layer of a mixture of polyamide and alpha-olefin vinyl alcohol copolymer. This film is claimed to have both gaseous permeability and oxygen barrier properties.

U.S. Patent Application Publication 2005/0163948 A1, "Smokable Polymeric Casing," Owen J. McGarel, published Jul. 28, 2005, describes a thermoplastic casing made with a novel polyvinyl alcohol/nylon blend, which, when exposed to gaseous smoke, produced some color on the encased sausages.

In summary, although several of the aforementioned plastic casing products have gained varying degrees of commercial acceptance in different market segments, their advantage compared to the traditional cellulosic casing has been chiefly one of cost, but having a number of problems including those of dimensional stability, uniformity of diameter, lack of permeability to smoke or only of a low to moderate level of permeability to gaseous smoke and not liquid smoke, and wrinkling.

SUMMARY OF THE DISCLOSURE

Provided is a thermoplastic casing or film that is permeable to both liquid and gaseous smoke components during the processing of encased foodstuffs, e.g., sausages. The thermoplastic casing or film may be extrudable and may be oriented by stretching in the transverse direction and/or the machine direction. The casing or film may be made with biaxial orientation, single-axis orientation or unoriented. The casing or film will have the mechanical properties needed for commercial use, such as dimensional stability, uniformity of diameter, uniformity of the gauge of the film, and a smooth, non-wrinkled surface.

Disclosed is a novel film that may be produced as an extruded film in flat or tubular form, oriented or non-oriented, and particularly for use as a food casing. This film is a blend of a polyamide matrix, a water-soluble, amorphous, copolymeric, polyvinyl alcohol and optionally, an antiblocking agent. The film comprises from at least about 20 wt. % to about 70 wt. % of an amorphous polyvinyl alcohol and from at least about 80 wt. % to about 30 wt. % of polyamide; and optionally, from approximately 3 wt. % to about 5 wt. % of an antiblocking agent. A preferred amount of the amorphous polyvinyl alcohol ranges from about 30 wt. % to about 60 wt. %, and a particularly preferred amount is from about 45 wt. % to about 60 wt. %, with the balance of the resin being a polyamide and optionally, from about 3 wt. % to about 5 wt. % of the antiblocking agent. A preferred form of the amorphous polyvinyl alcohol is or has been known as NICHIGO G-POLYMER® 8089, OKS-8089P, or NICHIGO G-POLYMER® OKS-8049LP, produced by Nippon Goshei of Japan. A United States patent on this amorphous polyvinyl alcohol was issued on Sep. 27, 2011, as U.S. Pat. No. 8,026,302 B2, "Polyvinyl Alcohol Resin Composition and Films," to Mitsuo Shibutani et al., and assigned to The Nippon Synthetic Chemical Industry Co., Ltd. ("'302").

Among its other attributes, the film is permeable to both liquid and gaseous smoke components to the extent that smoky flavor and/or smoky color transfers to the surface of the encased foodstuff comparable to the transfer as seen with cellulosic casing. The film has a moisture vapor transmission rate of greater than about 40 g/100 in$^2$/day/mil and ranges up to approximately 100 g/100 in$^2$/day/mil.

The film, when extruded as a tube or a flat film and formed into a casing, remains dimensionally stable once stuffed with foodstuff and throughout the cooking and smoking processing cycle.

Surprisingly, provided is a relatively simple process and film that achieve a high degree of performance in providing a dimensionally stable film of uniform diameter that is suitable for shining, stuffing, cooking, and smoking during the general manufacture of sausages such as frankfurters, and results in having a tight wrinkle-free appearance without requiring an after-shrinking step. The casing also has better oxygen barrier properties than does casing made of 100% nylon with an oxygen transmission rate of less than 1.0 100 in$^2$/24 hours atm/mil.

In one embodiment, the casing may be made by a continuous process in which a desired resin is melted and extruded through an annular die to form a tube, that is then cooled with water below the melting points of its components, biaxially oriented, and annealed at an elevated temperature to dimensionally stabilize the seamless tubular film.

Another embodiment is seen where the film is extruded as a flat film, cut into strips and formed into a tube, with the seam being glued with an adhesive, taped, or ultrasonically sealed. Various sizes of tubes can be formed that would make the final product anything from a large-sized casing to a bag large enough to wrap a large piece of meat.

DETAILED DESCRIPTION

The film hereof is particularly useful as small diameter casings and, even more particularly, as tubular casings that are used for processing foodstuffs, such as sausages made of emulsified meat or of coarsely ground meat, such as polish sausage, cotto salami, kielbasa, and bierwurst, and also of meat-substitute sausages, such as those made with processed beans or processed soybeans that are colored or flavored with the use of agents such as smoke during the processing cycle. It is also useful when made into larger tubes or flat films used to surround whole muscle meat products, such as hams, beef, chickens or chicken parts, veal, and pork, which are then cooked and smoked in the casings. Both gaseous and liquid smoke transfers through this permeable casing to the encased foodstuffs surface to produce both a smoky color and a smoky flavor that compares favorably to food cooked and smoked in cellulose-based casings or films. For example, after processing and smoking sausages in the inventive small diameter casings, encased links may be peeled off and the surface of the link is uniformly colored with a reddish-smoky color and a smoky flavor.

As the term is used herein, "casings" may be monolayer or multilayer, oriented or non-oriented, planar or tubular films, and may be in the form of pouches or bags. The tubular films may also be seamed or seamless. Any other variation of casings as practiced by those skilled in the art is included in this definition. The terms "casing" or "casings" and "film" or "films" are used interchangeably in this document.

The manufacture of thermoplastic casings is well known in the art and one of ordinary skill is aware of a variety of methods of producing them, examples being extruding resin through an annular die to produce a seamless tube or through a flat-slit die to obtain a flat sheet. This tube may be used as the final shape of the casing product, while flat sheets may be formed into a tube and backseamed to produce a casing. The tube may also be slit to form a sheet, which may then be backseamed. These are but a few ways known to produce tubes or flat sheets of thermoplastic films.

While attempting to invent a commercially acceptable thermoplastic casing that is highly permeable to smoke and that may be manufactured by extrusion technology, a number of resin blends of various polyvinyl alcohols ("PVOH") with various amounts and types of polyamides were tested, with limited or no success. During this process, an amorphous copolymer PVOH, known as NICHIGO G-POLYMER® OKS-8049P ("8049P") (registered trademark of Nippon Gohsei of Japan), manufactured by Nippon Gohsei of Japan ("G-Polymer"), in a polyamide matrix of polyamide 6/66 produced by UBE, was tested. Some general properties of this PVOH are given in Table 1 below.

TABLE 1

| General Properties of G-Polymer OKS-8049P | | |
|---|---|---|
| Properties | Unit | Value |
| Melt Flow Index at 210° C. | g/10 minutes | 5 |
| Melting point | ° C. | 185 |
| OTR at 20° C., 50% relative humidity | cc 20 μm/m$^2$ day · atm | 0.001 |
| Polymer density | g/cm$^3$ | 1.28 |

Figure 1:
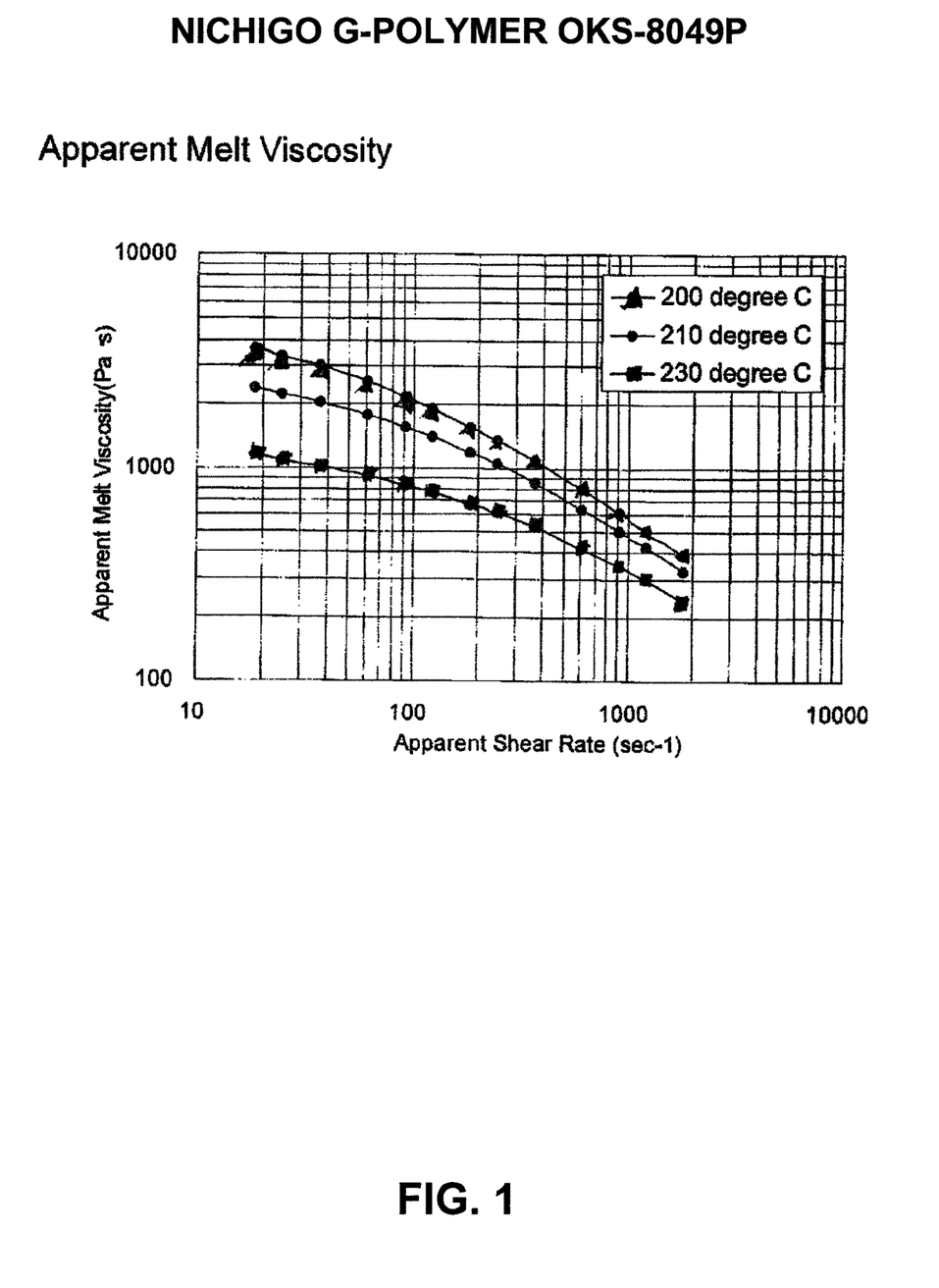
FIG. 1 is a graph showing the apparent melt viscosity of NICHIGO G-POLYMER® OKS-8049P ("8049P") at various temperatures.

The apparent melt viscosity (as described below) of 8049 at 210° C. is shown in FIG. 1.

Problems were encountered in the extrusion process using this resin blend. The problems included the inability to extrude the resin blends at all, development of a large number of gels in the film, limited ability to extrude the blends to form a primary tube, black specs in the tube, fumes being emitted from the extruder, and being unable to obtain correct biorientation on the bubble. These basic problems appeared to be caused by the G-Polymer resin.

A breakthrough occurred when the saponification level of the G-Polymer resin was lowered and an antiblock agent was added to the resin blend. This modified G-Polymer was first used to make a nonoriented flat sheet that was backseamed to form tubes. The tubes were stuffed, cooked, and smoked in a standard cooking and smoking cycle, using both gaseous and liquid smoke. The sausage produced had an acceptable smoky color and taste, superior to other tested thermoplastic films that approached the quality of sausages processed and smoked in cellulose casings. This particularly preferred resin is known under multiple names and used interchangeably in this document, as NICHIGO G-POLY- MER® OKS-8049LP, NICHIGO G-POLYMER® OKS-8089P, and NICHIGO G-POLYMER® 8089 ("OKS"). It is currently known commercially as NICHIGO G-POLYMER® OKS-8089P. The same UBE Nylon 6/66 as above was used for the polyamide matrix.

Once successful tests were run with flat films, it was attempted to produce extruded tubular casings. The extrusion problems noted earlier were no longer present, and the thermoplastic tubes extruded as desired. These tubes, or casings, were stuffed, processed, and smoked with either liquid or gaseous smoke as described above for the flat film tubes. Once again, the level of smoky color and taste imparted to the sausage approached the quality of color and taste as seen with cellulosic casing. The oxygen transmission rates ranged from about one-fourth to about the same level as seen in the control nylon casing, while the Moisture Vapor Transmission Rate was substantially higher than the same control nylon casing.

Some general properties of OKS are seen in Table 2 and the apparent melt viscosity is shown in FIG. 1.

TABLE 2

General Properties of NICHIGO G-POLYMER ® OKS-8049LP

| Properties | Unit | Value |
|---|---|---|
| Melt Flow Index at 210° C. | g/10 minutes | 2-4 |
| Melting point | ° C. | 154 |
| OTR at 20° C., 50% relative humidity | cc 20 μm/m² day · atm | 0.01 |
| Polymer density | g/cm³ | 1.28 |

G-Polymer, as described in the '302 patent, is A) a PVA resin having a 1,2-diol structural unit represented by the following general formula (1):

and having a saponification degree of 80 mol % to 97.9 mol %; and (B) an alkylene oxide adduct of a polyvalent alcohol containing 5 moles to 9 moles of an alkylene oxide per 1 mole of the polyvalent alcohol. It is a high amorphous content, copolymeric vinyl alcohol resin where crystallinity can be tailored down to the point of total amorphous character. Although it may be an amorphous resin, it also has crystalline-like functions, as seen with excellent gas barrier properties and good chemical resistance similar to conventional PVOH and ethylene vinyl alcohol copolymer resins, along with surprisingly excellent water solubility and far lower crystallinity. Specifically, it is water soluble at room temperature, is an outstanding gas barrier that is 600 times better when compared to 44 mol % ethylene vinyl alcohol, and 30 times better than 29 mol % ethylene vinyl alcohol, when measured dry, at 20° C. It is extrudable with a wide melt temperature processing window. A key property of G-Polymer is that it is extrudable without the use of any plasticizer, as compared to conventional PVOHs, which generally contain at least 15 wt. % of plasticizers, such as, water, glycerol, or polyethylene glycol. The lack of plasticizers keeps the G-Polymer oxygen barrier properties high (Soarus L.L.C. press release dated Apr. 28, 2009, "Soarus Introduces New Nichigo G-Polymer"). According to the '302 patent, films made from this PVOH "resin are useful, for example, as a temporary base material such as a hydraulic transfer film, a seeding sheet, a seeding tape or an embroidery base in applications which require water solubility. The laminate film is useful, for example, for a moisture conditioning container, a gas barrier packaging material, or a recyclable film or container. Exemplary applications of the laminate film include packages (unit packages) of chemical agents such as agricultural chemicals and detergents, sanitary products such as sanitary napkins, diapers and ostomy bags, and medical products such as blood absorption sheets." One use of film made from this resin includes small packages containing dishwashing soaps that dissolve during the dishwashing cycle, releasing the enclosed soaps.

Figure 2:
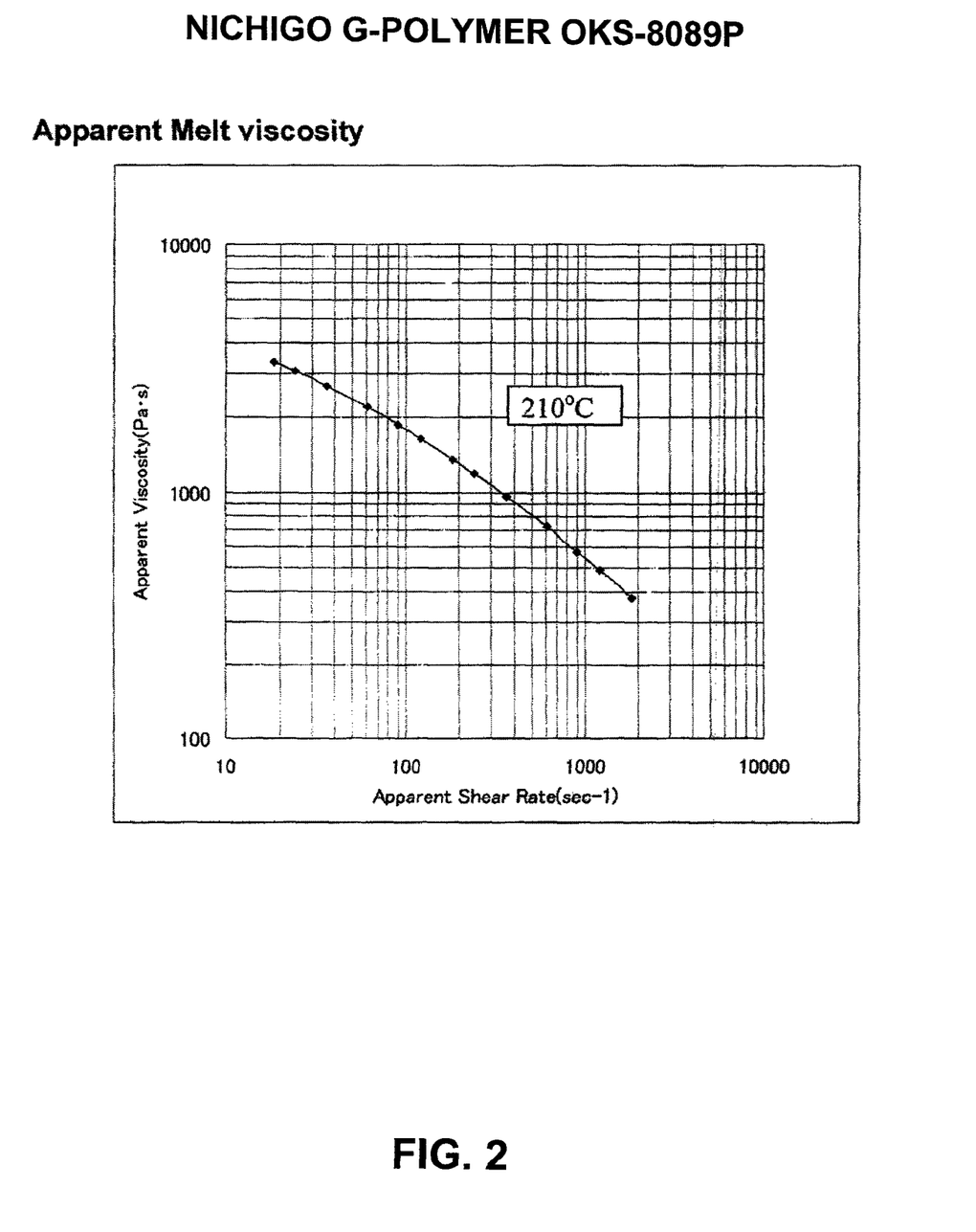
FIG. 2 is a graph showing the apparent melt viscosity of NICHIGO G-POLYMER® OKS-8049 LP (also OKS-8089P and OKS-8089) at 210° C.

For the disclosure, lowering the saponification level of G-Polymer and producing OKS altered G-Polymer's degree of crystalline structure and branching. Because of this, the polymer's rheological properties such as melt flow index, melting point, oxygen transmission rate, and melting viscosity were changed to an amount where OKS fit the manufacturing parameters as encountered in the extrusion and manufacture of smokable thermoplastic casings. FIG. 2 is a graph of the apparent melt viscosity of OKS. Melt shear viscosity is a material's resistance to shear flow. In general, polymer melts are highly viscous due to their long molecular chain structure. The viscosities of polymer melt ranges from 2 Pa·s to 3,000 Pa·s. Viscosity can be thought of as the thickness of a fluid, or how much it resists flow. Viscosity is expressed as the ratio of shear stress (force per unit area) to the shear rate (rate change of shear strain), as shown in the equation below:

Viscosity=Shear Stress/Shear Rate, where

Shear Stress=Force ($F$)/Area ($A$) and Shear Rate=Velocity ($v$)/Height ($h$)

Since the mobility of polymer molecular chains decreases with decreasing temperature, the flow resistance of polymer melt also greatly depends on the temperature. The melt viscosity decreases with increasing shear rate and temperature. In addition, the melt viscosity also depends on the pressure, the higher the pressure, the more viscous the melt becomes.

The curve of FIG. 2 was measured at 210° C. In order to accommodate the extrusion water quenching process and to make more compatible blends with various amounts and types of nylon polymers, a lower degree of hydrolysis of the amorphous PVOH was used to modify G-Polymer to produce OKS. A lower degree of hydrolysis shifted the melt-viscosity curve upward as compared to G-Polymer with a higher hydrolysis level, as shown in FIG. 1.

Although preferred polymers for use herein are those that have a high amorphous content are hydrophilic, copolymeric vinyl alcohol resins, such as those of the particularly preferred G-Polymer polyvinyl alcohols, other polymers, both homopolymers and/or copolymers, selected for this disclosure include cellulose ethers, polyalkylene oxides, vinyl alcohol ethers, and copolyester elastomers, all being water soluble.

In this inventive resin blend, the amount of a high amorphous content, hydrophilic, copolymer vinyl alcohol resin, such as those of the G-Polymer polyvinyl alcohols, ranges from about 20 weight percent ("wt. %") to about 70 wt. %, with a preferred amount of this polyvinyl alcohol resin ranging from about 30 wt. % to about 60 wt. %, and a particularly preferred amount from about 45 wt. % to about 60 wt. %.

An additional component of the film hereof is the polyamide used for the polyamide matrix. Polyamides are polymers having recurring amide (—CONH—) linking units in the molecular chain, and are well-known in the art. Polyamides include nylon resins that are well-known polymers having a multitude of uses including utility as packaging films, bags and casing. In particular, the novel thermoplastic films hereof are useful in food packaging. "Nylon" is a generic term for synthetic, high molecular weight ($M_n$=10,000) linear polyamides. Suitable nylons are commercially available and may be prepared by well-known methods. Suitable nylon polymers may be homopolymers, copolymers, or tertiary polymers, and blends and modifications thereof.

Suitable nylons for use in the disclosure include nylon 6, nylon 66, nylon 6/12 copolymer, nylon 6/66 copolymer, and amorphous nylons such as 6I/6T. Preferred polyamides are aliphatic nylons such as nylon 6, and copolymers thereof, and especially preferred are aliphatic nylon copolymers such as nylon 6/66, which exhibit highly desirable properties of meat adhesion, oxygen impermeability, mechanical strength, and ease of stretch orientation. Other nylons exhibiting similar properties would also be suitable for use in the disclosure.

A range of polyamides used as the polyamide matrix in this disclosure will depend on the type of polyamide used. However, the range for nylon used in the disclosure is from about 30 wt. % to about 80 wt. %; and the preferred amount being from about 40 wt. % to about 70 wt. %. The particularly preferred amount of polyamide used in this disclosure is from about 30 wt. % to about 80 wt. %. Preferred amounts of similar nylons are believed to also fall in these ranges, except 6I/6T. The amorphous nylon, 6I/6T can be added to the primary nylon in the matrix, in a range of from about 3 wt. % to about 10 wt. %, to make up the total amounts of nylon as described above.

An optional component of the extruded casing is a group of chemicals known as antiblocking agents. Blocking is the adherence of film surfaces to each other as during the blown film process or when roll stock or film-coated surfaces are stacked and subjected to pressure and heat. This adherence problem can be controlled with the use of antiblock concentrates such as diatomaceous earth, precipitated silica, amorphous silica, fatty amides, calcium carbonate, and ceramic spheres. The antiblock concentrate used in the examples herein was Techmer Anti-block, a diatomaceous earth sold by Techmer PM, of Clinton, Tenn., USA. Preferred amounts of antiblock compounds used will depend on the type of antiblock used, but generally, the amount of antiblock will range from about 3 wt. % to about 5 wt. % of the resin.

Thus, according to the disclosure, among other reasons, the polyvinyl alcohol component is selected such that the starting resin blend for forming the extruded, tubular inventive film (i.e., the blend comprising the amorphous polyvinyl alcohol resin, the polyamide and, optionally, the antiblocking agent) is extrudable so that extruded films may be processed therefrom.

According to a preferred embodiment hereof, the polyvinyl alcohol resin is a thermoplastic, amorphous, polyvinyl alcohol resin, having a high degree of water solubility at room temperature. The particularly preferred OKS PVOH is a thermoplastic, amorphous, polyvinyl alcohol resin having a melting point of 154° C., a melt flow index between 2-4 g at 210° C. for 10 minutes and with 2,160 grams, an oxygen transmission rate at 20° C. at 50% relative humidity of 0.01 cc 20 µm/m² day·atmosphere, and a polymer density of 1.28 g/cm³.

In addition, the polyvinyl alcohol may comprise at least one further additive, especially selected from the group consisting of slip additives, antioxidants, pigments, dyes, fillers and polymeric compounds as well as mixtures thereof.

The preferred composition of the newly invented film is a blend of a polyamide matrix of nylon 6/66 and NICHIGO G-POLYMER® OKS-8089P and, optionally, particularly when extruded as a tube, an antiblocking agent. The film comprises from at least about 30 wt. % to about 80 wt. % of polyamide and from at least about 20 wt. % to about 70 wt. % of OKS; preferably from at least about 40 wt. % to about 70 wt. % of polyamide and from at least about 30 wt. % to about 60 wt. % of OKS; and most preferably, from about 40 wt. % to about 55 wt. % polyamide and from about 45 wt. % to about 60 wt. % OKS. When extruding a tube, optionally, there may be added from approximately 3 wt. % to about 5 wt. % of an antiblocking agent.

Although the composition of the film is generally as described above, it may additionally contain other components, such as dyes, pigments, antioxidants, fillers and mixtures thereof, as are well known to those skilled in the art.

The film hereof may be made using a method for biaxially orienting thermoplastic films, in which a primary tube is formed by melt extruding a tube from an annular die. The primary tube can be made by any of the known techniques for extrusion of tubular plastic film. This extruded tube is cooled, collapsed, and then inflated between first and second means for blocking the interior of the tube, which means are set apart from one another to form an isolated fluidic mass or bubble, and the inflated tube is advanced through a heating zone to bring the tube to its draw temperature. In a draw or orientation zone, the tubing is radially expanded in the transverse direction ("TD") and pulled or stretched in the machine direction ("MD") at a temperature such that expansion occurs in both directions (preferably simultaneously)— the expansion of the tubing being accompanied by a sharp, sudden reduction of thickness at the draw point. The term, "heating zone," is used to define a region that includes both a zone of preliminary heating of the primary tubing to the draw temperature and also the draw or orientation zone.

In the disclosure, the tubing may be biaxially stretched by passing the tubing through a heating zone and rapidly radially extending the tubing when the tubing is at the draw temperature. The extended tubing is contacted with a stream of cooling fluid, while extended in the heating zone and the temperature of the cooling fluid, at least at one point within the heating zone, is substantially below the temperature to which the tubing has been heated during its flow through the heating zone up to the at least one point within the heating zone. The temperature of the cooling fluid in the draw zone is at least 10° F. (5° C.) below that of the tubing at the draw point. Preferably, the cooling fluid is air, and a stream of high velocity air is blown in a generally horizontal or vertical direction, toward the radially extended portion of the tubing.

Alternatively, film hereof may be made by sheet extrusion with orientation, e.g., by tentering. Tubes may be made from sheets of film by seaming using, e.g., adhesives or ultrasonic sealing. In this manner, various diameter tubes may be made from sheet film and tubular film may be slit and resized by seaming.

A preferred process hereof is a continuous process for making a tubular, biaxially stretched, heat-shrinkable thermoplastic food casing. This process comprises:

(a) providing a resin blend of an amorphous, hydrophilic, copolymeric polyvinyl alcohol, a nylon, and an antiblock agent in the ratios described herein;

(b) extruding therefrom a melt plasticized thermoplastic tube having at least one layer and having an exterior surface and an interior surface through an annular die;

(c) cooling the extruded tube below the melting point of the casing by applying water or chilled air to the exterior surface of the tube;

(d) transferring the cooled tube to an orientation zone wherein the tube is reheated to a temperature below the melting point of the tube layer with the lowest melting point, followed by cooling while a fluid mass is admitted to the interior of the tube as the tube is passed between first and second means for blocking fluid flow along the interior of the tube, thereby causing the tube to stretch circumferentially about the entrapped fluid mass and simultaneous with the circumferential stretching, the tube is stretched in a direction perpendicular thereto to produce a biaxially stretched tubular film; and (e) annealing the biaxially stretched film at elevated temperature to dimensionally stabilize the film.

This process can be adjusted using methods well known in the art to produce multilayered films where each layer is either the same or different from the adjacent layers, with each layer functioning either the same or differently from the adjacent layers.

EXAMPLES

The following examples further illustrate the description.

In all the following examples, unless otherwise indicated, the film compositions were produced generally using the apparatus and method described in U.S. Pat. No. 3,456,044 to Pahlke, which describes the double bubble method, and in further accordance with the detailed description above. All percentages are by weight unless indicated otherwise.

The casings of Examples 1 and 2 were produced using the following materials and under the following conditions. The specific concentrations of each resin component are enumerated in Example 1. The nylon 6/66 copolymer was obtained from BASF (C-40L) or from DSM, a NOVAMID®. The PVOH used was NICHIGO G-POLYMER® OKS-8049LP, obtained from Nippon Gohsei of Japan. The antiblock concentrate, a diatomaceous earth, PNM 12379 Techmer Anti-block, was purchased from Techmer PM, Clinton, Tenn., USA.

The tubular films were made as follows: The resin mixture was fed from a hopper into an attached single screw extruder where the resin was heat plasticized and extruded through a monolayer spiral die into a primary tube. The extrusion temperatures ranged from about 180° C. to 215° C. Die temperatures were set at a range of from about 210° C. to about 230° C. The monolayer primary tube was cooled with water at a temperature of 5° C. to 10° C. A primary tube with a diameter of about 7.0 mm was flattened by passage through a pair of nip rollers.

The primary tube was then reheated by immersion into hot water at 80° C. to 85° C. and biaxially stretched using a trapped bubble with an airtight seal. The oriented film was annealed at a temperature with a hot air heater allowing the film to relax from 10% to 15% in flat width and longitudinal directions.

The following test methods are referred to in this application and examples.

Experimental results of the following examples are based on tests similar to the following test methods unless noted otherwise:

Oxygen Gas Transmission Rate ($O_2$GTR): ASTM E-398-3

Water Vapor Transmission Rate (MVTR): ASTM E-398-3

L, a, b Test: Hunter L, a, b values are standard color scale values that indicate differences in brightness, hue and saturation using a standard color system that relates lightness as L values, and hue and croma as a combination of a and b values on a coordinate scale where a represents redness-greenness and b represents yellowness-blueness. L values describe the degree of darkness, where a value of 100 equals white and that of 0 equals black. a-values describe the degree of redness, which increases with an increasing a-value. b-values describe the degree of yellowness, which increases with increasing b-value. Hunter L, a, b and color scale values and opacity may be measured by the following tests. $\Delta E$ is a calculated measurement derived from the L, a, b values that assesses the degree of color from the control. The higher the $\Delta E$, the greater the color change.

Encased or peeled frankfurters may be tested as is. L, a, b values and opacity are measured using a colorimeter such as a Hunter D25-PC2Δ colorimeter available from Hunter Associate Laboratory, Inc., of Reston, Va., U.S.A., or the Color Machine Model 8900 available from Pacific Scientific.

Samples are placed on the sample plane of the colorimeter (which is calibrated using standard tiles according to the manufacturer's instructions) where a 45° incident light from a quartz-halogen lamp (clear bulb) illuminates the sample. An optical sensor placed at 0° (perpendicular to the sample plane) measures the reflected light, which is filtered to closely approximate CIE 2° Standard Observer for Illuminant C. Values are reported using a standard Hunter L, a, b color scale.

Frankfurters are held directly against the port opening, typically a circular opening about 0.5 inches (1.27 cm) in diameter. The aperture should be no larger than the area to be sampled. The frankfurter is placed with the axis of the longitudinal direction (machine direction) perpendicular to the path of the incident light travelling to the sample from the quartz-halogen lamp light source. It is generally positioned so that the exterior surface of the frankfurter is adjacent to the sample port. Alignment of the casing sample is checked to avoid obvious defects and L, a, b values are measured. The measuring is repeated to obtain a set of values, which are then averaged.

Averages were taken from twelve color readings (three per piece of sausage).

The disclosure will become clearer when considered together with the following examples, which are set forth as being merely illustrative of the disclosure and which are not intended, in any manner, to be limitative thereof. Unless otherwise indicated, all parts and percentages throughout the specification are by weight.

Example 1

Water and $O_2$ Transmission

The samples tested for oxygen transmission rate, moisture vapor transfer rate ("MVTR") and color transfer of liquid and gaseous smoke were as described below.

Three flat films, 1F, 2F, and 3F, hereof were made using resins comprising 20, 45 and 55 wt. % of NICHIGO G-POLYMER® OKS 8049LP("OKS") as described above, and 80, 55 and 45 wt. %, respectively, of nylon 6/66 copolymer made by DSM, a NOVAMID®. These sheets were formed into a tube and seamed with tape, stuffed with meat, and processed and smoked with both liquid and gaseous smoke.

Sample "NOJAX®," a cellulose casing produced and sold by Viskase Companies, Inc., Darien, Ill. USA (registered trademark of Viskase Companies, Inc.), was used as a positive color control.

Sample "POLYJAX®," a 100% polyamide casing produced and sold by Viskase Companies, Inc., Darien, Ill. USA (registered trademark of Viskase Companies, Inc.), was used as a negative color control.

Sample 1T contained 20 wt. % of OKS, 75 wt. % of nylon 6/66 from BASF, and 5 wt. % of the antiblock diatomaceous earth, from Techmer.

Sample 2T contained 30 wt. % of OKS, 65 wt. % of nylon 6/66 from BASF, and 5 wt. % of the Techmer antiblock.

Sample 3T contained 40 wt. % of OKS, 55 wt. % of nylon 6/66 from BASF, and 5 wt. % of the Tekmar antiblock.

Sample 4T contained 40 wt. % of OKS and 60 wt. % of nylon 6/66 from BASF.

Sample 5T contained 50 wt. % of OKS and 50 wt. % of nylon 6/66 from BASF.

Samples 1T-5T were extruded as tubes as described above. Samples 1F-3F were extruded as flat sheets and used for further testing. NOJAX® and POLYJAX® controls were standard casings sold by Viskase Companies, Inc.

Generally, as the percentage of OKS increased, the moisture water vapor transmission rate increased. When normalized for the differences in gauge, the MVTR increased from about 55 g/100 in$^2$/24 hours/mil to about 130 g/100 in$^2$/24 hours/mil. The oxygen transmission rate was generally less than that of the 100% polyamide control, ranging from about one-fifth to about the same as the polyamide control. The oxygen barrier properties increased as the amount of OKS increased as a percentage of the components of the inventive casings.

The inventive casing has a MVTR greater than about 40 g/100 in$^2$/day/mil, and preferably in a range of from about 40 to about 100 g/100 in$^2$/day/mil. The inventive casing has an oxygen transmission rate (in cc/100 in$^2$/24 hr atm/mil) of less than 1.05, and preferably in a range of from about 0.1 to about 1.05.

TABLE 3

Moisture Vapor Transfer Rate and O$_2$ Transmission Rate

| Samples | MVTR g/100 in$^2$/day/mil | O$_2$ Transmission Rate cc/100 in$^2$/24 hours atm/mil |
|---|---|---|
| NOJAX ® | >1000 | |
| POLYJAX ® | 30 | 1.5 |
| 1F | 80.5 | 1.71855 |
| 2F | 125.1 | 0.70962 |
| 3F | 106.5 | 0.33918 |
| 1T | 55.3 | 1.01732 |
| 2T | 61.5 | 0.59591 |
| 3T | 92.0 | 0.36911 |
| 4T | 105.3 | 0.45197 |
| 5T | 130.0 | 0.30261 |

Additional samples of the inventive casing were prepared and tested for color transference, as described above. Results on duplicate samples are given. Nylon 6/66 used was made by either UBE or NOVAMID® and the G-Polymer used was OKS-8089P. The specific formulations are given in Table 4.

TABLE 4

Moisture Vapor Transfer Rate and O$_2$ Transmission Rate

| Samples | MVTR g/100 in$^2$/day/mil | O$_2$ Transmission Rate cc/100 in$^2$/24 hours atm/mil |
|---|---|---|
| 100% UBE | 60.1/48.9 | 3.8/2.8 |
| 80% UBE + 20% G-Polymer | 93.6/100.9 | 1.44/1.43 |
| 70% UBE + 30% G-Polymer | 114.4/113.0 | —/0.65 |
| 70% NOVAMID ® + 30% G-Polymer | 118.2/120.1 | 1.02/0.91 |

In Table 4, the 100% UBE Nylon 6/66 film, while showing an acceptable MVTR, does not have an acceptable oxygen transmission rate, while of the test samples, only the last two samples show acceptable MVTR and oxygen transmission rates.

Example 2

Smoke Transference

All samples were stuffed with all meat frankfurter emulsions by hand and fainted into individual links. The links of sausages were processed as they would be in a commercial manufacturer's factory, using heat, humidity, and cook cycle times consistent with processing a meat emulsion product. During the processing cycle, some of the stuffed links were exposed to gaseous smoke and others to liquid smoke. Once the links were finished cooking, the casing was then mechanically slit and the released links were examined for L, a, b values.

The results of the L, a, b tests are shown in Table 5.

TABLE 5

Smokable Casing Color Data

| | Liquid smoke^ | | | | Gaseous smoke** | | | |
|---|---|---|---|---|---|---|---|---|
| Sample | L | a | b | Δ E* | L | a | b | Δ E* |
| NOJAX ® | 56.05 | 19.89 | 22.77 | 13.9 | 54.23 | 20.63 | 25.53 | 16.3 |
| POLYJAX ® | 66.29 | 13.79 | 15.55 | 0.0 | 66.23 | 13.92 | 16.83 | 0.0 |
| 1F (20% OKS) | 58.42 | 12.36 | 24.6 | N/A | 63.68 | 13.49 | 19.21 | |
| 2F (45% OKS) | 56.26 | 18.89 | 26.16 | N/A | 58.01 | 16.35 | 23.58 | |
| 3F (55% OKS) | 57.08 | 18.47 | 26.87 | N/A | 58.68 | 16.98 | 24.82 | |
| 1T (20% OKS) | 63.84 | 15.88 | 18.52 | 4.4 | 63.39 | 15.44 | 18.49 | 3.6 |
| 2T (30% OKS) | 61.49 | 16.73 | 18.34 | 6.3 | 61.58 | 16.32 | 20.47 | 6.4 |
| 3T (40% OKS) | 58.9 | 19.48 | 20.75 | 10.7 | 57.41 | 18.56 | 22.62 | 11.5 |
| 4T (40% OKS), no antiblock | N/A | | | | 59.22 | 17.3 | 23.62 | 10.3 |
| 5T (50% OKS), no antiblock | N/A | | | | 55.57 | 18.45 | 23.46 | 13.3 |

^Atomized Red Arrow 24P liquid smoke
**Natural hickory wood smoke
*As the Δ E increases, more smoke color will be observed.

When using the L, a, b color measuring scale, a totally opaque film will have an L value of approximately 100. A difference of 2 to 3 units is noticeable by the human eye. As shown in Table 4, all of the sausages processed in the film hereof developed color. Even the film containing the lowest amount of OKS, 20%, produced liquid and gaseous smoke-treated links with a decrease of approximately 2.5 L to 8.22 L units (the lower the number, the darker the color) as compared to the sausages encased in the POLYJAX® 100% nylon casings. The meat processed in casing that was extruded as tubes and contained 40 wt. % OKS developed the most color, as shown by having 7.04 less L units when liquid smoke was used and 8.8 L units when gaseous smoke was used than did the meat processed in the nylon control film. These casings containing 40 wt. % of OKS were within approximately 3 L units of the cellulose film, whether liquid or gaseous smoke was used. The ΔE values given also show that the amount of color observed increased with increasing amounts of OKS.

Additional samples of the inventive casing were prepared and tested for color transference, as described above. Nylon 6/66 used were either UBE (FD5) or DSM's NOVAMID®. The G-Polymer used was OKS-8089P, and any antiblock was diatomaceous earth from Techmer as described above. The formulas are shown in the tables below.

TABLE 6

| | Liquid smoke^ | | | Gaseous smoke** | | |
|---|---|---|---|---|---|---|
| Sample | L | a | b | L | a | b |
| NOJAX ® | 49.18 | 21.35 | 23.20 | 52.62 | 19.85 | 22.62 |
| POLYJAX ® | 64.43 | 12.85 | 15.85 | 64.63 | 12.59 | 15.85 |
| 75% NOVAMID ® + 20% G-Polymer + 5% antiblock | 57.59 | 17.30 | 19.71 | 59.05 | 16.01 | 18.67 |
| 55% NOVAMID ® + 40% G-polymer + 5% antiblock | 53.49 | 19.35 | 20.13 | 57.94 | 16.89 | 16.67 |
| 60% NOVAMID ® + 40% G-Polymer | 53.04 | 19.48 | 19.99 | 56.89 | 17.36 | 19.59 |

^Atomized Red Arrow 24P liquid smoke
**Natural hickory wood smoke.

TABLE 7

| | Gaseous smoke** | | |
|---|---|---|---|
| Sample | L | a | b |
| POLYJAX ® | 62.27 | 11.46 | 17.68 |
| 70% NOVAMID ® + 30% G-Polymer | 52.68 | 14.89 | 21.44 |
| 80% UBE + 20% G-polymer | 55.45 | 14.03 | 20.82 |
| 100% UBE | 60.34 | 12.08 | 18.89 |

**Natural hickory wood smoke.

Further modifications of the embodiment(s) disclosed will be apparent to those skilled in the art and all such modifications are deemed to be within the scope of the invention as defined by the following claims.

We claim:

1. A smokable, heat-shrinkable film useable for food packaging, the film comprising:
   (i) at least one hydrophilic, copolyvinyl alcohol resin with a high amorphous content, in amounts of from about 20 wt. % to about 70 wt. %, based on the weight of the film,
   wherein the copolyvinyl alcohol resin comprises
   (A) a poly vinyl alcohol ("PVA") resin having a 1,2-diol structural unit represented by the following general formula:

and having a saponification degree of 80 to 97.9 mol-%; and
   (B) an alkylene oxide adduct of a polyvalent alcohol containing 5 to 9 moles of an alkylene oxide per 1 mole of the polyvalent alcohol;
   (ii) at least one polyamide, in amounts of from about 30 wt. % to about 80 wt. %, based on the weight of the film; and
      a) wherein the polyamide is aliphatic or a blend of aliphatic and amorphous polyamide; and
   (iii) optionally, at least one antiblock agent, in amounts of from about 3 wt. % to about 5 wt. %, based on the weight of the film;
   and that allows the transfer of both liquid and gaseous smoke through the film.

2. The film of claim 1, having a moisture vapor transfer rate ("MVTR") of greater than 40 g/100 in$^2$/day/mil and an oxygen transmission rate of less than 1.05 cc/100 in$^2$/24 hr atm/mil.

3. The film of claim 1, wherein the film is additionally seamless, tubular, and biaxially stretched.

4. The film of claim 1, wherein the copolyvinyl alcohol resin has a melt flow index determined at 210° C. and 2.16 kg from 2 g to 4 g/10 minutes and a melting point of 154° C. and percentage of volatile matter of less than 0.5%.

5. The film of claim 1, wherein the copolyvinyl alcohol resin comprises at least one further additive selected from the group consisting of a slip additive, antioxidant, pigment, dye, filler, polymeric compound, and mixtures of any thereof.

6. The film of claim 1, wherein the polyamide is selected from the group consisting of nylon 6, nylon 66, nylon 6,12, nylon 6/12 copolymer, nylon 6/66 copolymer and nylon 6I/6T.

7. The film of claim 1, wherein the antiblock agent is selected from the group consisting of barium sulfate, diatomaceous earth, silica, calcium carbonate, fatty amides and ceramic spheres.

8. A method of making a sausage of the type comprising encasing sausage meat within a film, the method comprising:
   utilizing the film of claim 1 as the film.

9. A smokable, heat-shrinkable film useable for food packaging, the film comprising:
   (i) a hydrophilic, amorphous, copolyvinyl alcohol resin having a melt flow index determined at 210° C. and 2.16 kg from 2 to 4 g/10 minutes, a melting point of 154° C., and less than 0.5% of volatile matter, in amounts of from about 20 wt. % to about 70 wt. %, based on the weight of the film;
   (ii) at least one polyamide selected from the group consisting of nylon 6, nylon 66, nylon 6,12, nylon 6/12 copolymer, nylon 6/66 copolymer, and nylon 6I/6T, in amounts of from about 30 wt. % to about 80 wt. %; and
   (iii) the copolyvinyl alcohol resin optionally comprises at least one further additive selected from the group consisting of a slip additive, antioxidant, pigment, dye, filler, and mixtures thereof;
   wherein both liquid and gaseous smoke is transferable through the film.

10. The film of claim 9, wherein said film comprises a moisture vapor transfer rate ("MVTR") of greater than 40 g/100 in$^2$/day/mil and an oxygen transmission rate of less than 1.05 cc/100 inches$^2$/24 hr atm/mil.

11. The film of claim 10, wherein said film comprises at least one antiblock agent selected from the group consisting of barium sulfate, diatomaceous earth, silica, calcium carbonate, fatty amides, and ceramic spheres, in amounts of from about 3 wt. % to about 5 wt. %.

12. The film of claim 9, wherein said film comprises said copolyvinyl alcohol resin in amounts of from about 25 wt. % to about 60 wt. % and said polyamides in amounts of from about 40 wt. % to about 75 wt. %.

13. The film of claim 12, wherein said film comprises a MVTR of greater than 40 g/100 in$^2$/day/mil and an oxygen transmission rate of less than 1.05 cc/100 inches$^2$/24 hr atm/mil.

14. The film of claim 13, wherein the film comprises at least one antiblock agent selected from the group consisting of barium sulfate, diatomaceous earth, silica, calcium carbonate, fatty amides, and ceramic spheres, in amounts of from about 3 wt. % to about 5 wt. %.

15. A film comprising, based upon the weight of the film:
from about 20 wt. % to about 70 wt. % of at least one copolyvinyl alcohol resin, wherein the copolyvinyl alcohol resin is hydrophilic and amorphous, and wherein the copolyvinyl alcohol resin has a melt flow index determined at 210° C. and 2.16 kg from 2 g to 4 g/10 minutes and a percentage of volatile matter of less than 0.5%;
from about 30 wt. % to about 80 wt. % of at least one polyamide, wherein the polyamide is aliphatic or a blend of aliphatic and amorphous polyamide; and
from about 3 wt. % to about 5 wt. % of at least one antiblock agent selected from the group consisting of barium sulfate, diatomaceous earth, silica, calcium carbonate, fatty amides and ceramic spheres;
wherein both liquid and gaseous smoke transfer though the film, and wherein the film is seamless, tubular, and biaxially stretched.

16. The film of claim 15, further comprising:
at least one further additive selected from the group consisting of a slip additive, antioxidant, pigment, dye, filler, polymeric compound, and mixture of any thereof.

17. A method of making the film of claim 1, the method comprising:
(a) providing a resin blend comprising:
(i) at least one hydrophilic copolyvinyl alcohol resin with a high amorphous content in amounts of from 20 wt. % to 70 wt. % based on the weight of the resin blend, wherein the copolyvinyl alcohol resin comprises (A) a polyvinyl alcohol resin having a 1,2-diol structural unit represented by the following general formula and having a saponification degree of 80 to 97.9 mol-%; and
(B) an alkylene oxide adduct of a polyvalent alcohol containing 5 to 9 moles of an alkylene oxide per 1 mole of the polyvalent alcohol;
(ii) at least one polyamide in amounts of from 30 wt. % to 80 wt. % based on the weight of the resin blend, wherein the polyamide is aliphatic or a blend of aliphatic and amorphous polyamide; and
(iii) optionally, at least one anti block agent, in amounts of from 3 wt. % to 5 wt. %, based on the weight of the resin blend;
(b) extruding the resin blend through a melt plasticized thermoplastic tube having at least one layer and having an exterior surface and an interior surface through an annular die;
(c) cooling the extruded tube below the melting point of the casing by applying water or chilled air to the exterior surface of the tube;
(d) transferring the cooled tube to an orientation zone, wherein the tube is reheated to a temperature below the melting point of the tube layer with the lowest melting point, followed by cooling while a fluid mass is admitted to the interior of the tube as the tube is passed between first and second means for blocking fluid flow along the interior of the tube, thereby causing the tube to stretch circumferentially about the entrapped fluid mass and, simultaneous with the circumferential stretching, the tube being stretched in a direction perpendicular thereto to produce a biaxially stretched tubular film; and
(e) annealing the biaxially stretched film at elevated temperature to dimensionally stabilize the film.

* * * * *